United States Patent
Kim et al.

(10) Patent No.: US 10,851,269 B2
(45) Date of Patent: Dec. 1, 2020

(54) PRESSURE-SENSITIVE ADHESIVE COMPOSITION

(71) Applicant: LG Chem, Ltd., Seoul (KR)

(72) Inventors: Kee Young Kim, Daejeon (KR); Il Jin Kim, Daejeon (KR); Jeong Ae Yoon, Daejeon (KR); Sung Soo Yoon, Daejeon (KR); Su Jeong Kim, Daejeon (KR); Sang Hyun Hong, Daejeon (KR)

(73) Assignee: LG Chem, Ltd.

( * ) Notice: Subject to any disclaimer, the term of this patent is extended or adjusted under 35 U.S.C. 154(b) by 297 days.

(21) Appl. No.: 15/513,760

(22) PCT Filed: Dec. 16, 2015

(86) PCT No.: PCT/KR2015/013801
§ 371 (c)(1),
(2) Date: Mar. 23, 2017

(87) PCT Pub. No.: WO2016/099149
PCT Pub. Date: Jun. 23, 2016

(65) Prior Publication Data
US 2017/0283666 A1    Oct. 5, 2017

(30) Foreign Application Priority Data

Dec. 16, 2014  (KR) .................. 10-2014-0181434
Dec. 23, 2014  (KR) .................. 10-2014-0187438
Dec. 15, 2015  (KR) .................. 10-2015-0179554

(51) Int. Cl.
| | |
|---|---|
| C09J 11/06 | (2006.01) |
| C09J 7/22 | (2018.01) |
| C09J 7/38 | (2018.01) |
| C08F 293/00 | (2006.01) |
| C09J 153/00 | (2006.01) |
| C08K 5/3412 | (2006.01) |
| C08K 5/3445 | (2006.01) |
| G02F 1/1335 | (2006.01) |

(52) U.S. Cl.
CPC ............ *C09J 11/06* (2013.01); *C08F 293/00* (2013.01); *C08F 293/005* (2013.01); *C09J 7/22* (2018.01); *C09J 7/38* (2018.01); *C09J 153/00* (2013.01); *C08K 5/3412* (2013.01); *C08K 5/3445* (2013.01); *C09J 2203/318* (2013.01); *C09J 2401/006* (2013.01); *C09J 2453/00* (2013.01); *C09J 2467/005* (2013.01); *G02F 1/133528* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 9,798,056 B2 | 10/2017 | Lee et al. | |
| 2005/0181148 A1 | 8/2005 | Kim et al. | |
| 2008/0241995 A1* | 10/2008 | Fukui | C08G 59/08 438/109 |
| 2009/0275705 A1* | 11/2009 | Fujita | C08F 293/00 525/342 |
| 2011/0123799 A1* | 5/2011 | Yasui | C08F 220/18 428/354 |
| 2012/0300299 A1* | 11/2012 | Yasui | C09J 7/22 359/483.01 |
| 2013/0034728 A1 | 2/2013 | Kataoka et al. | |
| 2014/0242303 A1 | 8/2014 | Lee et al. | |

FOREIGN PATENT DOCUMENTS

| | | |
|---|---|---|
| CN | 1168681 A | 12/1997 |
| CN | 1764679 A | 4/2006 |
| CN | 102911629 A | 2/2013 |
| EP | 2857471 B1 | 9/2017 |
| KR | 20000025443 A | 5/2000 |
| KR | 20050076706 A | 7/2005 |
| KR | 20090039498 | 4/2009 |
| KR | 101023839 B1 | 3/2011 |
| KR | 101171976 B1 | 8/2012 |
| KR | 101171977 B1 | 8/2012 |
| KR | 20130135157 A | 12/2013 |
| KR | 20140128887 A | 11/2014 |
| TW | 201020622 A | 6/2010 |
| TW | 201217488 A | 5/2012 |
| TW | 201412915 A | 4/2014 |
| WO | 2013180524 A1 | 12/2013 |
| WO | 2013180536 A1 | 12/2013 |

OTHER PUBLICATIONS

Search Report from International Application No. PCT/KR2015/013801, dated Apr. 19, 2016.
Chinese Search Report for Application No. 201580054942.0 dated Apr. 25, 2018.

* cited by examiner

*Primary Examiner* — Megan McCulley
(74) *Attorney, Agent, or Firm* — Lerner, David, Littenberg, Krumholz & Mentlik, LLP

(57) ABSTRACT

A pressure-sensitive adhesive composition, which may have excellent durability under high temperature or humidity conditions and exhibit high close adhesion to optical films, thereby forming a pressure-sensitive adhesive having superior cuttability and re-workability, is provided. Also, a pressure-sensitive adhesive composition capable of forming a pressure-sensitive adhesive capable of effectively inhibiting bending when applied to a thin substrate such as a very thin glass substrate, minimizing a time required to stabilize physical properties, and preventing a degradation of the secured physical properties in time, a pressure-sensitive adhesive optical member formed using such a pressure-sensitive adhesive composition, an optical laminate, and a display device are provided.

17 Claims, No Drawings

PRESSURE-SENSITIVE ADHESIVE COMPOSITION

CROSS-REFERENCE TO RELATED APPLICATIONS

The present application is a national phase entry under 35 U.S.C. § 371 of International Application No. PCT/KR2015/013801 filed Dec. 16, 2015, published in Korean, which claims priority from Korean Patent Application No. 10-2014-0181434, filed Dec. 16, 2014, Korean Patent Application No. 10-2014-0187438, filed Dec. 23, 2014, and Korean Patent Application No. 10-2015-0179554, filed Dec. 15, 2015, all of which are incorporated herein by reference.

FIELD

The present application relates to a pressure-sensitive adhesive composition, an optical laminate, a polarizing plate, and a display device.

BACKGROUND

Display devices are generally implemented using a pressure-sensitive adhesive or an adhesive. For example, a liquid crystal display device (LCD) includes a liquid crystal panel serving as a display panel, and an optical film. Here, a pressure-sensitive adhesive or an adhesive may be used to attach the optical film to the liquid crystal panel, or to laminate optical films to each other. The optical film includes a polarizing film, a retardation film, or a brightness enhancement film, and the pressure-sensitive adhesive or adhesive may be used to laminate optical films or attach an optical film to an adherend such as a liquid crystal panel.

The pressure-sensitive adhesive or adhesive for optical films has major desired physical properties such cohesiveness, adhesiveness, re-workability, low light leakage characteristics, and stress relief. Patent Documents 1 to 3 propose pressure-sensitive adhesives to achieve the physical properties.

In recent years, panels using a substrate having a very small thickness have often been used as display panels. In this case, pressure-sensitive adhesives or adhesives applied to such panels have a serious need for preventing bending of the panels after adhesion. Also, the pressure-sensitive adhesive or adhesive for optical films basically requires securing durability under high temperature and/or humidity conditions, and may also require proper antistatic performance.

Also, the pressure-sensitive adhesive or adhesive for optical films requires close adhesion to optical films. When the close adhesion to the optical films is insufficient, the pressure-sensitive adhesive or adhesive may leak while films are cut. Such leakage may cause contamination of other optical films or display panels, and may also make it difficult to secure sufficient adhesion at edge regions of the adhered optical films. Further, when rework is necessary, that is, an attached optical film should be peeled again due to an insufficient close adhesion, the pressure-sensitive adhesive may remain on the adhesion area, thereby causing various problems.

PRIOR ART DOCUMENTS

Patent Documents

Patent Document 1: Korean Registered Patent No. 1023839
Patent Document 2: Korean Registered Patent No. 1171976
Patent Document 3: Korean Registered Patent No. 1171977

DESCRIPTION

Object

The present application is directed to providing a pressure-sensitive adhesive composition having excellent durability under high temperature or humidity conditions and exhibiting high close adhesion to optical films, thereby forming a pressure-sensitive adhesive optical member having superior cuttability and re-workability. Also, the present application is directed to providing a pressure-sensitive adhesive composition capable of forming a pressure-sensitive adhesive capable of effectively inhibiting bending when applied to a thin substrate such as a very thin glass substrate, minimizing a time required to stabilize physical properties, and preventing a degradation of the secured physical properties in time. Further, the present application is directed to providing a pressure-sensitive adhesive optical member formed using such a pressure-sensitive adhesive composition, an optical laminate, and a display device.

Solution

One aspect of the present application provides an illustrative pressure-sensitive adhesive composition including (A) a block copolymer as one component. In this specification, the term "block copolymer" may refer to a copolymer including blocks of different polymerized monomers.

The block copolymer may include a first block having a glass transition temperature of 50° C. or higher and a second block having a glass transition temperature of −10° C. or less. In this specification, the expression "glass transition temperature of a predetermined block" in the block copolymer may refer to a glass transition temperature calculated for monomers forming such a block. According to one illustrative embodiment, the glass transition temperature of the first block may be greater than or equal to 60° C., 65° C., 70° C., 75° C., 80° C., 85° C., 90° C., or 95° C. Also, an upper limit of the glass transition temperature of the first block is not particularly limited, but the glass transition temperature of the first block may, for example, be less than or equal to approximately 150° C., 140° C., 130° C., or 120° C. As such, the glass transition temperature of the second block may also be less than or equal to approximately −20° C., −30° C., −35° C., or −40° C. Also, a lower limit of the glass transition temperature of the second block is not particularly limited, but the glass transition temperature of the second block may, for example, be greater than or equal to approximately −80° C., −70° C., −60° C., or −55° C. For example, the block copolymer including at least two blocks may form a fine phase-separated structure in a pressure-sensitive adhesive. Such a block copolymer may exhibit proper cohesiveness and stress relief against a change in temperature, and thus may be used to form a pressure-sensitive adhesive with a superior maintenance characteristic for the physical properties required for optical films such as durability and reliability, light leakage prevention properties and re-workability.

In the block copolymer, the first block may, for example, have a number average molecular weight ($M_n$) of 2,500 to 150,000. For example, the number average molecular weight of the first block may refer to a number average molecular weight of a polymer prepared by polymerizing only monomers to form the first block or to a number average molecular weight of a large initiator when the first block serves as the large initiator. The number average molecular weight recited in this specification may, for example, be measured by a method presented in Examples using a gel permeation chromatography (GPC). According to another illustrative embodiment, the number average molecular weight of the first block may be less than or equal to approximately 100,000, approximately 90,000, approximately 80,000, approximately 70,000, approximately 60,000, approximately 50,000, approximately 40,000, or approximately 35,000. According to another illustrative embodiment, the number average molecular weight of the first block may also be greater than or equal to approximately 5,000, approximately 10,000, approximately 15,000, approximately 20,000, or approximately 25,000.

The block copolymer may have a number average molecular weight ranging from 50,000 to 300,000. According to another illustrative embodiment, the number average molecular weight of the block copolymer may be greater than or equal to 90,000, approximately 100,000, approximately 150,000, or approximately 200,000. According to another illustrative embodiment, the number average molecular weight of the block copolymer may also be less than or equal to approximately 250,000. The block copolymer may have a polydispersity index (PDI; $M_w/M_n$), that is, a ratio ($M_w/M_n$) of a weight average molecular weight ($M_w$) to a number average molecular weight ($M_n$) ranging from approximately 1.0 to 3.5 or approximately 1.4 to 2.0. A pressure-sensitive adhesive composition or a pressure-sensitive adhesive having excellent physical properties may be provided by adjusting molecular weight characteristics as described above.

According to one illustrative embodiment, the block copolymer may be a cross-linkable copolymer containing a cross-linkable functional group. Examples of the cross-linkable functional group may include a hydroxyl group, a carboxyl group, an isocyanate group, or a glycidyl group. For example, a hydroxyl group may be used as the cross-linkable functional group.

When the block copolymer contains a cross-linkable functional group, the functional group may, for example, be included in either the first or second block, or included in both the first and second blocks. According to one illustrative embodiment, the cross-linkable functional group may be contained in the second block having a low glass transition temperature. In this case, the first block does not contain a cross-linkable functional group, but the second block may contain a cross-linkable functional group. When the cross-linkable functional group is contained in the second block, the block copolymer may exhibit proper cohesiveness and stress relief against a change in temperature, and thus may be used to form a pressure-sensitive adhesive with a superior maintenance characteristic for the physical properties required for optical films such as durability and reliability, light leakage prevention properties and re-workability.

In the block copolymer, types of the monomers used to form the first block and the second block are not particularly limited as long as the glass transition temperature is ensured by combination of the respective monomers.

According to one illustrative embodiment, the first block may include a polymerized unit derived from a (meth)acrylic acid ester monomer. In this specification, a monomer included in a polymer or a block as a polymerized unit may refer to a monomer undergoing a polymerization reaction to form the backbone, for example, a main chain or side chains of the polymer or the block. For example, an alkyl (meth)acrylate may be used as the (meth)acrylic acid ester monomer. According to one illustrative embodiment, an alkyl (meth)acrylate containing an alkyl group having 1 to 20 carbon atoms, 1 to 16 carbon atoms, 1 to 12 carbon atoms, 1 to 8 carbon atoms, or 1 to 4 carbon atoms may be used in consideration of controlling cohesiveness, glass transition temperature, and pressure-sensitive adhesivity. Examples of such a monomer may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth)acrylate, and lauryl (meth)acrylate. Among these, one or more of the monomers may be chosen and used to ensure the glass transition temperature. Among the monomers, a (meth)acrylic acid ester monomer, for example, an alkyl methacrylate containing an alkyl group having 1 to 20 carbon atoms, 1 to 16 carbon atoms, 1 to 12 carbon atoms, 1 to 8 carbon atoms, or 1 to 4 carbon atoms, may be used as the monomer used to form the first block in consideration of ease in controlling the glass transition temperature, etc., but the present application is not particularly limited thereto.

The second block of the block copolymer may, for example, include a polymerized unit derived from 90 parts by weight to 99.9 parts by weight of a (meth)acrylic acid ester monomer and 0.1 parts by weight to 10 parts by weight of a copolymerizable monomer containing a cross-linkable functional group. In this specification, the unit "part(s) by weight" may refer to a weight ratio between the respective components. For example, the expression "the second block including the polymerization unit derived from 90 parts by weight to 99.9 parts by weight of the (meth)acrylic acid ester monomer and 0.1 parts by weight to 10 parts by weight of the copolymerizable monomer containing a cross-linkable functional group" as described above may means that the weight ratio (A:B) of the (meth)acrylic acid ester monomer (A) and the copolymerizable monomer (B) containing the cross-linkable functional group, both of which are used to form the polymerized unit of the second block, may be in a range of 90 to 99.9:0.1 to 10.

Among the monomer which may be included in the first block, types of monomers which are copolymerizable with the copolymerizable monomers to finally ensure the glass transition temperature within this temperature range may be chosen and used as the (meth)acrylic acid ester monomer to form the second block. Among the above-described monomers, an acrylic acid ester monomer, for example, an alkyl acrylate containing an alkyl group having 1 to 20 carbon atoms, 1 to 16 carbon atoms, 1 to 12 carbon atoms, 1 to 8 carbon atoms, or 1 to 4 carbon atoms, may be used as the (meth)acrylic acid ester monomer used to form the second block in consideration of ease in controlling the glass transition temperature, etc., but the present application is not particularly limited thereto.

For example, a monomer (e.g., a (meth)acrylic acid ester monomer) having a site copolymerizable with another monomer included in the block copolymer, and a monomer containing the above-described cross-linkable functional group, for example, a hydroxyl group, may be used as the copolymerizable monomer containing the cross-linkable functional group. In the field of producing the pressure-sensitive adhesive, the copolymerizable monomers containing the cross-linkable functional group as described above are widely known in the related art. All of the monomers may be used for the polymer. For example, the copolymerizable monomer containing a hydroxyl group that may be used herein may include a hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate, or 8-hydroxyoctyl (meth)acrylate, or a hydroxyalkyleneglycol (meth)acrylate such as 2-hydroxyethylene glycol (meth)acrylate or 2-hydroxypropylene glycol (meth)acrylate, but the present application is not limited thereto. Among the above-described monomers, a hydroxyalkyl acrylate or a hydroxyalkyleneglycol acrylate may be used in consideration of reactivity with other monomers used to form the second block, or ease in controlling the glass transition temperature, etc., but the present application is not limited thereto.

For example, the first block and/or the second block may further include another comonomer when the comonomer is required to control the glass transition temperature, when necessary. Also, the first block and/or the second block may include the monomer as a polymerization unit. The comonomer may include a nitrogen-containing monomer such as (meth)acrylonitrile, (meth)acrylamide, N-methyl (meth)acrylamide, N-butoxy methyl (meth)acrylamide, N-vinyl pyrrolidone, or N-vinyl caprolactam; an alkylene oxide group-containing monomer such as alkoxy alkyleneglycol (meth)acrylic acid ester, alkoxy dialkyleneglycol (meth)acrylic acid ester, alkoxy trialkyleneglycol (meth)acrylic acid ester, alkoxy tetraalkyleneglycol (meth)acrylic acid ester, alkoxy polyethylene glycol (meth)acrylic acid ester, phenoxy alkyleneglycol (meth)acrylic acid ester, phenoxy dialkyleneglycol (meth)acrylic acid ester, phenoxy trialkyleneglycol (meth)acrylic acid ester, phenoxy tetraalkyleneglycol (meth)acrylic acid ester, or phenoxy polyalkyleneglycol (meth)acrylic acid ester; a styrene-based monomer such as styrene or methyl styrene; a glycidyl group-containing monomer such as glycidyl (meth)acrylate; or a carboxylic acid vinyl ester such as vinyl acetate, but the present application is not limited thereto. One or more proper types of such comonomers may be chosen and included in the polymer, when necessary. Such a comonomer may, for example, be included in the block copolymer at a content of 20 parts by weight or less, or 0.1 parts by weight to 15 parts by weight, based on the sum of the weights of other monomers in each of the blocks.

For example, the block copolymer may include the first block at 5 parts by weight to 50 parts by weight and the second block at 50 parts by weight to 95 parts by weight. The pressure-sensitive adhesive composition and the pressure-sensitive adhesive having excellent physical properties may be provided by adjusting a weight ratio between the first block and the second block as described above. According to another illustrative embodiment, the block copolymer may include the first block at 5 parts by weight to 45 parts by weight and the second block at 55 parts by weight to 95 parts by weight, or may include the first block at 5 parts by weight to 45 parts by weight and the second block at 60 parts by weight to 95 parts by weight.

According to another illustrative embodiment, the block copolymer may include the second block at approximately 50% by weight or more, approximately 55% by weight or more, approximately 60% by weight or more, approximately 65% by weight or more, approximately 70% by weight or more, approximately 75% by weight or more, or approximately 80% by weight or more. The block copolymer may include the first block at a content of approximately 99% by weight or less, approximately 95% by weight or more. In this case, the second block may be included at a content of approximately 5 to 100 parts by weight, based on 100 parts by weight of the first block. The second block may be included at a content of approximately 90 parts by weight or less, approximately 80 parts by weight or less, approximately 70 parts by weight or less, approximately 60 parts by weight or less, approximately 50 parts by weight or less, approximately 40 parts by weight or less, approximately 30 parts by weight or less, approximately 20 parts by weight or less, or approximately 15 parts by weight or less, based on 100 parts by weight of the first block.

According to one illustrative embodiment, the block copolymer may be a diblock copolymer including the first and second blocks, that is, a block copolymer including only two blocks, that is, the first and second blocks. Using the diblock copolymer may lead to a superior maintenance of durability and reliability, stress relief and re-workability of the pressure-sensitive adhesive.

A method of preparing the block copolymer is not particularly limited, and the block copolymer may be prepared using conventional methods. The block polymer may, for example, be polymerized using a living radical polymerization (LRP) method. Examples of the method may include an anionic polymerization method using an organic rare earth metal complex as a polymerization initiator or using an organic alkali metal compound as a polymerization initiator to synthesize a block copolymer in the presence of a salt of an inorganic acid such as a salt of an alkali metal or alkali earth metal, an anionic polymerization method using an organic alkali metal compound as a polymerization initiator to synthesize a block copolymer in the presence of an organic aluminum compound, an atom transfer radical polymerization (ATRP) method using an atom transfer radical polymerizing agent as a polymerization control agent, an activators regenerated by electron transfer (ARGET) ATRP method using an atom transfer radical polymerizing agent as a polymerization control agent to polymerize a block copolymer in the presence of an organic or inorganic reducing agent in which electrons are generated, an initiators for continuous activator regeneration (ICAR) ATRP method, a polymerization method using reversible addition-fragmentation chain transfer (RAFT) using an inorganic reducing agent or a reversible addition-fragmentation chain transfer agent, or a method using an organic tellurium compound as an initiator. Among these methods, an appropriate method may be chosen and used.

The pressure-sensitive adhesive composition may further include (B) a cross-linking agent capable of cross-linking the block copolymer as an additional component. A cross-linking agent containing at least two functional groups capable of reacting with a cross-linkable functional group included in the block copolymer may be used as the cross-linking agent. Examples of such a cross-linking agent may include an isocyanate cross-linking agent, an epoxy cross-linking agent, an aziridine cross-linking agent, or a metal chelate cross-linking agent. For example, when the block copolymer (A) includes a hydroxyl group as the cross-linkable functional group, a multifunctional isocyanate compound may be typically used as the cross-linking agent. In the present application, the multifunctional isocyanate compound may refer to a compound containing two or more isocyanate groups, for example, approximately 2 to 10, approximately 2 to 9, approximately 2 to 8, approximately 2 to 7, approximately 2 to 6, approximately 2 to 5, or approximately 2 to 4 isocyanate groups.

Examples of the multifunctional isocyanate compound that may be used as the cross-linking agent may, for example, include a diisocyanate compound such as tolylene diisocyanate, xylene diisocyanate, diphenylmethane diisocyanate, hexamethylene diisocyanate, isoboron diisocyanate, tetramethylxylene diisocyanate, or naphthalene diisocyanate; or a compound reacting at least one polyol selected from the group consisting of the diisocyanate compounds, but the present application is not limited thereto. Examples of the polyol that may be used herein may include trimethylolpropane, etc.

Among theses, one or more cross-linking agents may be used in the pressure-sensitive adhesive composition, but the cross-linking agent that may be used is not limited thereto.

In the pressure-sensitive adhesive composition, the multifunctional cross-linking agent may, for example, be included at a content of 0.01 parts by weight to 10 parts by weight, based on 100 parts by weight of the block copolymer. According to another illustrative embodiment, the cross-linking agent may be included at a content of 0.03 parts by weight or more, or 0.05 parts by weight or more. According to another illustrative embodiment, the cross-linking agent may also be included at a content of 8 parts by weight or less, 6 parts by weight or less, 4 parts by weight or less, 2 parts by weight or less, or 1 part by weight or less. Within this content range, gel fraction, cohesiveness, adhesiveness and durability of the pressure-sensitive adhesive may be maintained excellently.

The pressure-sensitive adhesive composition may further includes (C) a multifunctional epoxy compound or a multifunctional aziridine compound as an additional component. In the present application, the term "multifunctional epoxy compound" may refer to a compound containing two or more epoxy groups, for example, approximately 2 to 10, approximately 2 to 9, approximately 2 to 8, approximately 2 to 7, approximately 2 to 6, approximately 2 to 5, or approximately 2 to 4 epoxy groups, and the term "multifunctional aziridine compound" may refer to a compound containing two or more aziridine groups, for example, approximately 2 to 10, approximately 2 to 9, approximately 2 to 8, approximately 2 to 7, approximately 2 to 6, approximately 2 to 5, or approximately 2 to 4 aziridine groups. Since the pressure-sensitive adhesive composition further includes such a compound, a pressure-sensitive adhesive having excellent interfacial adhesion to a member such as an optical film may be formed.

Unless particularly defined otherwise in this specification, the term "epoxy group" may refer to a monovalent residue derived from a cyclic ether containing three ring-membered atoms or a compound including the cyclic ether. Examples of the epoxy group may include a glycidyl group, an epoxyalkyl group, a glycidoxyalkyl group, or an alicyclic epoxy group. As such, the alicyclic epoxy group may refer to a monovalent residue derived from a compound which has an aliphatic hydrocarbon ring structure, and has a structure in which two carbon atoms forming the aliphatic hydrocarbon ring are also used to form an epoxy group. Examples of the alicyclic epoxy group may include an alicyclic epoxy group having 6 to 12 carbon atoms. For example, a 3,4-epoxycyclohexylethyl group may be used as the alicyclic epoxy group. Also, the term "aziridine group" may refer to a heterocyclic functional group having three ring-membered atoms, that is, a functional group containing one amine group and two methylene bridges or a derivative derived from the functional group.

In particular, the component (C) may contribute to an improvement of the close adhesion between the pressure-sensitive adhesive and the optical film. For example, when the pressure-sensitive adhesive is formed on an optical film into which a functional group such as a hydroxyl group or a carboxyl group is introduced as will be described below, the close adhesion between the optical film and the pressure-sensitive adhesive may be enhanced due to various chemical or physical interactions between the component (C) and the functional group on the optical film.

Examples of the multifunctional epoxy compound of the component (C) may include at least one selected from the group consisting of ethylene glycol diglycidyl ether, triglycidyl ether, trimethylolpropane triglycidyl ether, N,N,N',N'-tetraglycidyl ethylenediamine, and glycerin diglycidyl ether, and examples of the multifunctional aziridine compound may include N,N'-toluene-2,4-bis(1-aziridine carboxamide), N,N'-diphenylmethane-4,4'-bis(1-aziridine carboxamide), triethylene melamine, bisisoprotaloyl-1-(2-methylaziridine), and tri-1-aziridinylphosphineoxide, but the present application is not limited thereto.

In the pressure-sensitive adhesive composition, the component (C) may be included at a content of 0.1 to 10 parts by weight, based on 100 parts by weight of the block copolymer (A). According to another illustrative embodiment, the component (C) may be included at a content of 0.3 parts by weight or more, based on 100 parts by weight of the component (A). Also, the component (C) may be included at a content of 8 parts by weight or less, 6 parts by weight or less, or 4 parts by weight or less, based on 100 parts by weight of the component (A). Within this content range, a proper close adhesion to the optical film may be ensured, and other physical properties required for the pressure-sensitive adhesive may also be stably maintained.

The pressure-sensitive adhesive composition may further include (D) at least one compound selected from the group consisting imidazole compound, phosphine compound, amine compound, phenolic compound, and acid anhydride as an additional component. Such a compound may serve to facilitate physical or chemical interaction of the pressure-sensitive adhesive composition or the pressure-sensitive adhesive with a surface of the optical film, further strengthen close adhesion to the surface of the optical film, and curtail a time required to ensure the close adhesion.

For example, compounds that may be used as the component (D) include the imidazole compound, the phosphine compound, the amine compound or the phenolic compound, as will be described below.

That is, a compound represented by the following Formula 1 may be used as the imidazole compound.

[Formula 1]

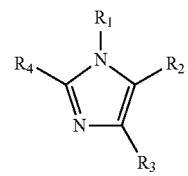

In Formula 1, $R_1$ to $R_4$ are each independently hydrogen, an alkyl group, or an aryl group.

In Formula 1, examples of the alkyl group may include an alkyl group having 1 to 20 carbon atoms, 1 to 16 carbon atoms, 1 to 12 carbon atoms, 1 to 8 carbon atoms, or 1 to 4 carbon atoms, and such an alkyl group may be linear, branched, or cyclic, and may be optionally substituted with at least one substituent.

In Formula 1, examples of the aryl group may include an aryl group having 6 to 30 carbon atoms, 6 to 24 carbon atoms, 6 to 18 carbon atoms, or 6 to 12 carbon atoms, and such an aryl group may be optionally substituted with at least one substituent.

As for the compound of Formula 1, a compound in which $R_1$ is hydrogen or an alkyl group, and $R_2$ to $R_4$ are each independently hydrogen, an alkyl group, or an aryl group, where at least $R_4$ and/or $R_3$ is an alkyl group or an aryl group, may be used.

Examples of such a compound may include 2-methylimidazole, 2-ethylimidazole, 2-undecylimidazole, 2-heptadecylimidazole, 2-ethyl-4-methylimidazole, 2-phenylimidazole, or 2-phenyl-4-methylimidazole, but the present application is not limited thereto.

For example, a compound represented by the following Formula may be used as the phosphine compound.

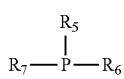

[Formula 2]

In Formula 2, $R_5$ to $R_7$ are each independently hydrogen, an alkyl group, or an aryl group.

The alkyl group or aryl group in Formula 2 is as defined in Formula 1.

Examples of the compound represented by Formula 2 may include triphenylphosphine, tributylphosphine, tri(p-meta-phenyl)phosphine, or tri(nonylphenyl)phosphine.

For example, a compound represented by the following Formula 3 or 4 may be used as the amine compound.

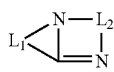

[Formula 3]

In Formula 3, $L_1$ and $L_2$ are each independently an alkylene group.

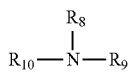

[Formula 4]

In Formula 4, $R_8$ to $R_{10}$ are each independently hydrogen, an alkyl group, an aryl group, an arylalkyl group, or a hydroxyalkyl group.

The alkyl group or aryl group in Formula 3 or 4 is as defined in Formula 1.

Also, in Formula 3, examples of the alkylene group may include an alkylene group having 1 to 20 carbon atoms, 1 to 16 carbon atoms, 1 to 12 carbon atoms, 1 to 8 carbon atoms, or 1 to 4 carbon atoms, and such an alkylene group may be linear, branched, or cyclic, and may be optionally substituted with at least one substituent.

Examples of the compound represented by Formula 3 or 4 may include 1,8-diazabicyclo[5.6.0]undec-7-ene, benzyl dimethylamine, or triethanolamine, but the present application is not limited thereto.

For example, a compound represented by the following Formula 5 may be used as the phenolic compound.

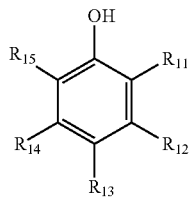

[Formula 5]

In Formula 5, $R_{11}$ to $R_{15}$ are each independently hydrogen, an alkyl group, an aminoalkyl group, an alkylaminoalkyl group, or a dialkylaminoalkyl group.

The alkyl group or aryl group in Formula 5 is as defined in Formula 1.

Examples of the compound of Formula 5 may, for example, include a compound in which $R_{11}$ to $R_{15}$ are each independently hydrogen, an alkyl group, an aminoalkyl group, an alkylaminoalkyl group, or a dialkylaminoalkyl group, where at least one of $R_{11}$ to $R_{15}$ is an aminoalkyl group, an alkylaminoalkyl group, or a dialkylaminoalkyl group.

Examples of such a compound may include 2-(dimethylaminomethyl)phenol, but the present application is not limited thereto.

Also, a maleic anhydride or a tetrahydrophthalic anhydride may be used as the acid anhydride-based compound, but the present application is not limited thereto.

In the pressure-sensitive adhesive composition, the component (D) may be included at a content of 0.001 to 5 parts by weight, based on 100 parts by weight of the block copolymer (A). According to another illustrative embodiment, the component (D) may be included at a content of 0.005 parts by weight or more, based 100 parts by weight of the component (A), and, according to another illustrative embodiment, may be included at a content of 4 parts by weight or less, 3 parts by weight or less, 2 parts by weight or less, or 1 parts by weight or less, based on 100 parts by weight of the component (A). Within this content range, desired close adhesion and the like may be ensured, and other physical properties may also be maintained stably.

The pressure-sensitive adhesive composition may further include a tin-based compound as an additional component. Such a tin-based compound may serve to effectively cross-link a pressure-sensitive adhesive by means of interaction with the component (D) and simultaneously enable the cross-linked pressure-sensitive adhesive to exhibit excellent interfacial adhesion to the optical film.

An organic tin compound may be used as the tin-based compound. For example, dialkyl tin oxide, fatty acid salts of dialkyl tin, or fatty acid salts of tin maybe used. Specifically, dialkyl tin oxide or dialkyl tin dilaurate may be used. In the types of the tin compound, an alkyl may be a linear, branched or cyclic alkyl having 1 to 20 carbon atoms, 1 to 16 carbon atoms, 1 to 12 carbon atoms, 1 to 8 carbon atoms, or 1 to 4 carbon atoms.

In the pressure-sensitive adhesive composition, the tin-based compound may be included at a content of 0.001 to 5 parts by weight, based on 100 parts by weight of the block copolymer (A). According to another illustrative embodiment, the tin-based compound may be included at a content of 0.005 parts by weight or more, based on 100 parts by weight of the component (A), and, according to another illustrative embodiment, may be included at a content of 4 parts by weight or less, 3 parts by weight or less, 2 parts by weight or less, or 1 parts by weight or less, based on 100 parts by weight of the component (A). Within this content range, a desired cross-linking degree and close adhesion may be ensured, and other physical properties may also be stably maintained.

The pressure-sensitive adhesive composition may further include an ionic compound as an additional component. An inorganic salt or an ionic liquid may be used as the ionic compound. It was confirmed that the ionic liquid has a more advantageous effect than the inorganic salt in terms of ensuring the above-described interfacial adhesion or causing no delay of curing. In the present application, the term "ionic liquid" may refer to an ionic compound which is present in a liquid phase at room temperature. As such, the room temperature may refer to a temperature in a natural environment, neither increased nor decreased, for example, a temperature ranging from approximately 10° C. to 30° C., approximately 15° C. to 30° C., approximately 20° C. to 30° C., approximately 25° C., or approximately 23° C.

The ionic compound may be included in the pressure-sensitive adhesive composition so that the pressure-sensitive adhesive has a proper antistatic property.

When the inorganic salt is used as the ionic compound, examples of the inorganic salt that may be used herein may include a salt containing an alkali metal cation or an alkali earth metal cation. Examples of such a cation may include one or two or more of lithium ion ($Li^+$), sodium ion ($Na^+$), potassium ion ($K^+$), rubidium ion ($Rb^+$), cesium ion ($Cs^+$), beryllium ion ($Be^{2+}$), magnesium ion ($Mg^{2+}$), calcium ion ($Ca^{2+}$), strontium ion ($Sr^{2+}$), and barium ion ($Ba^{2+}$). For example, one or two or more of lithium ion, sodium ion, potassium ion, magnesium ion, calcium ion, and barium ion may be used as the cation. In this case, lithium ion may be used in consideration of ionic stability and mobility.

Meanwhile, an onium salt-containing compound including nitrogen, sulfur or phosphorus as a cation component may be used as the ionic liquid. Examples of such a cation may include a quaternary ammonium compound such as N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium, or N-ethyl-N,N,N-trioctylammonium; phosphonium or a derivative thereof (such as tetraalkyl phosphonium), pyridinium or a derivative thereof, tetrahydropyridinium or a derivative thereof, dihydropyridinium or a derivative thereof, imidazolium or a derivative thereof, a compound having a pyrroline backbone or a derivative thereof, a compound having a pyrrole backbone or a derivative thereof, imidazolium or a derivative thereof (such as 1-ethyl-3-methylimidazolium), pyrazolium or a derivative thereof, trialkylsulfonium or a derivative thereof, pyrrolidinium or a derivative thereof (such as 1-methyl-1-propyl pyrrolidinium), or piperidinium or a derivative thereof (such as 1-methyl-1-propyl piperidinium. In the present application, a compound including a cation, in which the alkyl group included in the cation is substituted with an alkoxy group, a hydroxyl group, an akynyl group, or an epoxy group among the above-described types of the cation, may also be used.

According to one illustrative embodiment, a cation represented by the following Formula A may be used as the cation in the ionic liquid.

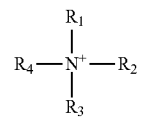

[Formula A]

In Formula A, $R_1$ to $R_4$ each independently represent hydrogen, an alkyl, an alkoxy, an akenyl, or an akynyl.

In Formula A, the alkyl or alkoxy may be an alkyl or alkoxy having 1 to 20 carbon atoms, 1 to 12 carbon atoms, 1 to 8 carbon atoms, or 1 to 4 carbon atoms. Also, the alkyl or alkoxy may be a linear, branched or cyclic alkyl or alkoxy, and may be optionally substituted with at least one substituent.

In Formula A, the akenyl or akynyl may be an akenyl or akynyl having 2 to 20 carbon atoms, 2 to 12 carbon atoms, 2 to 8 carbon atoms, or 2 to 4 carbon atoms. Also, the akenyl or akynyl may be a linear, branched or cyclic akenyl or akynyl, and may be optionally substituted with at least one substituent.

In definition of Formula A, when the alkyl, alkoxy, akenyl or akynyl is substituted with at least one substituent, examples of the substituent may include hydroxy, alkyl, alkoxy, akenyl, akynyl, cyano, thiol, amino, aryl, or heteroaryl, but the present application is not limited thereto.

According to one illustrative embodiment, $R_1$ to $R_4$ in Formula A may be each independently an alkyl, for example, a linear or branched alkyl having 1 to 12 carbon atoms. In Formula A, $R_1$ to $R_4$ each independently represent a linear or branched alkyl having 1 to 12 carbon atoms, provided that $R_1$ to $R_4$ do not represent an alkyl having the same number of carbon atoms as the same time. In this case, within the limits imposed by Formula A, a case in which all $R_1$ to $R_4$ represent an alkyl group having the same number of carbon atoms is excluded. When all $R_1$ to $R_4$ represent an alkyl group having the same number of carbon atoms, the compound may have a higher probability of existing in a solid phase at room temperature.

In Formula A, $R_1$ may be an alkyl having 1 to 3 carbon atoms, and $R_2$ to $R_4$ may be each independently an alkyl having 4 to 20 carbon atoms, 4 to 15 carbon atoms, or 4 to 10 carbon atoms. Using such a cation, a pressure-sensitive adhesive exhibiting superior optical properties, pressure-sensitive adhesive properties, workability and antistatic properties, having an increased close adhesion to a base and requiring a shorter time by such as curing to stabilize physical properties may be provided.

Examples of the anion included in the ionic compound $PF_6^-$, $AsF^-$, $NO_2^-$, fluoride ($F^-$), chloride ($Cl^-$), bromide ($Br^-$), iodide Up, perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzenesulfonate ($CH_3(C_6H_4)SO_3^-$), p-toluenesulfonate ($CH_3C_6H_4SO_3^-$), tetraborate ($B_4O_7^{2-}$), carboxybenzenesulfonate ($COOH(C_6H_4)SO_3^-$), trifluoromethanesulfonate ($CF_3SO_2^-$), benzoate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$), or trispentafluoroethyl trifluorophosphate ($P(C_2F_5)_3F_3^-$).

According to another illustrative embodiment, an anion represented by the following Formula B, or bis(fluorosulfonyl) imide may be used as the anion.

$[X(YO_mR_f)_n]^-$ [Formula B]

In Formula B, X represents a nitrogen atom or a carbon atom, Y represents a carbon atom or a sulfur atom, $R_f$ represents a perfluoroalkyl group, m is 1 or 2, and n is 2 or 3.

In Formula B, m may be 1 when Y is carbon, m may be 2 when Y is sulfur, n may be 2 when X is nitrogen, and n may be 3 when X is carbon.

The anion of Formula B or the bis(fluorosulfonyl) imide exhibits high electronegativity due to the presence of a perfluoroalkyl group ($R_f$) or a fluoro group, and also has a unique resonance structure. Thus, the anion of Formula B or the bis(fluorosulfonyl) imide forms a weak bond with the cation, and simultaneously exhibits hydrophobicity. Therefore, the ionic compound may exhibit excellent compatibility with the other components of the composition such as a polymer and also give high antistatic properties even when used in a small amount.

$R_f$ of Formula B may be a perfluoroalkyl group having 1 to 20 carbon atoms, 1 to 12 carbon atoms, 1 to 8 carbon atoms, or 1 to 4 carbon atoms. In this case, the perfluoroalkyl group may have a linear, branched or cyclic structure. The anion of Formula B may be a sulfonyl methide-based, sulfonyl imide-based, carbonyl methide-based, or carbonyl imide-based anion. Specifically, the anion of Formula B may include tristrifluoromethanesulfonyl methide, bistrifluoromethanesulfonyl imide, bisperfluorobutanesulfonyl imide, bispentafluoroethanesulfonyl imide, tristrifluoromethanecarbonyl methide, bisperfluorobutanecarbonyl imide, or bispentafluoroethanecarbonyl imide, which may be used alone or in combination.

In the pressure-sensitive adhesive composition, the ionic compound may be present at a content of 0.01 to 15 parts by weight, 0.01 to 10 parts by weight, 0.01 to 5 parts by weight, 0.1 to 5 parts by weight, or 0.5 to 5 parts by weight, based on 100 parts by weight of the block copolymer (A). Within this content range, desired antistatic properties may be ensured, and other desired physical properties such as close adhesion to an optical film may also be stably maintained.

The pressure-sensitive adhesive composition may further include a silane coupling agent. For example, a silane coupling agent containing a β-cyano group or an acetoacetyl group may be used as the silane coupling agent. Such a silane coupling agent may, for example, enable the pressure-sensitive adhesive, which is formed using a copolymer having a low molecular weight, to exhibit excellent close adhesion and adhesive stability, and also to excellently maintain durability and reliability in heat-resistance and humidity-heat-resistance conditions.

For example, a compound represented by the following Formula 5 or 6 may be used as the silane coupling agent containing a β-cyano group or an acetoacetyl group.

$(R_1)_n Si(R_2)_{(4-n)}$ [Formula 5]

$(R_3)_n Si(R_2)_{(4-n)}$ [Formula 6]

In Formula 5 or 6, $R_1$ is a β-cyanoacetyl group or a β-cyanoacetylalkyl group, $R_3$ is an acetoacetyl group or an acetoacetylalkyl group, $R_2$ is an alkoxy group, and n is an integer ranging from 1 to 3.

In Formula 5 or 6, the alkyl group may be an alkyl group having 1 to 20 carbon atoms, 1 to 16 carbon atoms, 1 to 12 carbon atoms, 1 to 8 carbon atoms, or 1 to 4 carbon atoms, and such an alkyl group may be linear, branched, or cyclic.

In Formula 5 or 6, the alkoxy group may be an alkoxy group having 1 to 20 carbon atoms, 1 to 16 carbon atoms, 1 to 12 carbon atoms, 1 to 8 carbon atoms, or 1 to 4 carbon atoms, and such an alkoxy group may be linear, branched, or cyclic.

In Formula 5 or 6, n may, for example, be 1 to 3, 1 to 2, or 1.

Examples of the compound of Formula 5 or 6 may, for example, include acetoacetylpropyl trimethoxy silane, acetoacetylpropyl triethoxy silane, β-cyanoacetylpropyl trimethoxy silane, or β-cyanoacetylpropyl triethoxy silane, but the present application is not limited thereto.

In the pressure-sensitive adhesive composition, the silane coupling agent may be included at a content of 0.01 parts by weight to 5 parts by weight, or 0.01 parts by weight to 1 parts by weight, based on 100 parts by weight of the block copolymer (A). Within this content range, desired physical properties may be effectively given to the pressure-sensitive adhesive.

The pressure-sensitive adhesive composition may further include a tackifier, when necessary. For example, the tackifier that may be used herein may include a hydrocarbon-based resin or a hydrogenated product thereof, a rosin resin or a hydrogenated product thereof, a rosin ester resin or a hydrogenated product thereof, a terpene resin or a hydrogenated product thereof, a terpene phenolic resin or a hydrogenated product thereof, a polymerized rosin resin, or a polymerized rosin ester resin, which may be used alone or in combination, but the present application is not limited thereto. In the pressure-sensitive adhesive composition, the tackifier may be included at a content of 100 parts by weight or less, based on 100 parts by weight of the block copolymer.

The pressure-sensitive adhesive composition may also further include at least one additive selected from the group consisting of an epoxy resin, a curing agent, a UV stabilizer, an antioxidant, a toning agent, a reinforcing agent, a filler, am antifoaming agent, a surfactant, and a plasticizer, when necessary.

The pressure-sensitive adhesive composition may have a gel fraction of 80% by weight or less after formation of a cross-linked structure. The gel fraction may be calculated from the following Equation 1.

Gel fraction (%)=$B/A$×100 [Equation 1]

In Equation 1, A represents a mass of the pressure-sensitive adhesive composition whose cross-linked structure is realized, and B represents a dry mass of the insoluble content collected for 72 hours after the pressure-sensitive adhesive composition having a mass A precipitates from ethyl acetate at room temperature in a net having a 200 mesh size.

When the gel fraction is maintained at 80% by weight or less, workability, durability and reliability and re-workability may be excellently maintained. A lower limit of the gel fraction of the pressure-sensitive adhesive composition is not particularly limited, and may, for example, be 0% by weight. However, the gel fraction of 0% by weight does not mean that the pressure-sensitive adhesive composition is not cross-linked at all. For example, the pressure-sensitive adhesive composition whose gel fraction is 0% by weight includes a pressure-sensitive adhesive composition which is not cross-linked at all, or a pressure-sensitive adhesive composition which is cross-linked to some extent but whose cross-linking degree is too low to hold gel in the net having a 200 mesh size.

The pressure-sensitive adhesive composition may be a pressure-sensitive adhesive composition for optical films. The pressure-sensitive adhesive composition for optical films may, for example, be used to laminate an optical film such as a polarizing film, a retardation film, an anti-glare film, a wide viewing angle compensation film, or a brightness enhancement film, or attach the optical film or a laminate thereof to an adherend such as a liquid crystal panel. According to one illustrative embodiment, the pressure-sensitive adhesive composition may be a pressure-sensitive adhesive composition for polarizing plates, that is, a pressure-sensitive adhesive composition used to attach to a polarizing film to a liquid crystal panel.

Another aspect of the present application provides a pressure-sensitive adhesive optical member, for example, a pressure-sensitive adhesive polarizing plate. The illustrative optical member may include an optical film, and a pressure-sensitive adhesive layer formed on one or both surfaces of the optical film. For example, the pressure-sensitive adhesive layer may be a pressure-sensitive adhesive layer used to attach the optical film to a liquid crystal panel of LCD, or other optical films. Also, the pressure-sensitive adhesive layer may include the above-described pressure-sensitive adhesive composition according to one illustrative embodiment of the present application. The pressure-sensitive adhesive composition may be included in the pressure-sensitive adhesive layer in a state in which a cross-linked structure of the pressure-sensitive adhesive composition is realized. As such, examples of the optical film may include a polarizer, a polarizing plate, a retardation film, or a brightness enhancement film, or a laminate of two or more. In the present application, the terms "polarizer" and "polarizing plate" are used as concepts distinct from each other. For example, the polarizer may refer to a layer itself having a polarizing function such as a polyvinyl alcohol film as will be described below, and the polarizing plate may refer to a laminate including such a polarizer in conjunction with other elements.

In the optical member, a functional group which can interact with the pressure-sensitive adhesive layer, for example, a hydroxyl group, an amino group, a carboxyl group, a urethane bond, or a urea bond may be introduced between the optical film and the pressure-sensitive adhesive layer, for example, introduced onto a surface of the optical film to which the pressure-sensitive adhesive layer is attached. Such a functional group may reinforce close adhesion of the pressure-sensitive adhesive layer to the optical film by means of physical or chemical interaction with the multifunctional isocyanate compound, the multifunctional epoxy compound or the multifunctional aziridine compound present in the pressure-sensitive adhesive layer. An optical film formed of a polymer having such a functional group in a molecule thereof may be used, or the functional group may be introduced onto an optical film using adhesion-facilitating treatment such as corona discharge or plasma treatment. In the present application, a surface of the optical film onto which such a functional group is introduced, or a region of the optical film subjected to the corona discharge or plasma treatment may be referred to as an adhesion-facilitating treatment layer.

Conditions for the corona discharge or plasma treatment performed to introduce such a functional group are not particularly limited, and methods known in the related art may be chosen and used.

Still another aspect of the present application provides a pressure-sensitive adhesive polarizing plate. For example, the polarizing plate may have a structure in which an optical film is a polarizer of the pressure-sensitive adhesive optical member.

Types of the polarizer included in the polarizing plate are not particularly limited. For example, general types of polarizers, such as a polyvinyl alcohol-based polarizer, known in the related in the art may be used without limitation.

A polarizer is a functional film that can extract light vibrating in one direction from incident light while vibrating in various directions. For example, such a polarizer may have a structure in which a dichroic dye is adsorbed onto a polyvinyl alcohol-based resin film and aligned. The polyvinyl alcohol-based resin constituting the polarizer may be, for example, obtained by gelling a polyvinyl acetate-based resin. In this case, the polyvinyl acetate-based resin that may be used herein may include vinyl acetate, and a copolymer of other monomers copolymerizable with the vinyl acetate, as well as a homopolymer of vinyl acetate. As such, examples of the monomer copolymerizable with the vinyl acetate may include an unsaturated carboxylic acid, an olefin, vinyl ether, an unsaturated sulfonic acid, and an acrylamide containing an ammonium group, which may be used alone or in combination, but the present application is not limited thereto. Typically, the polyvinyl alcohol-based resin may have a degree of gelation of approximately 85 mole % to 100 mole %, preferably 98 mole % or more. The polyvinyl alcohol-based resin may be further modified. For example, polyvinyl formal or polyvinyl acetal modified with an aldehyde may be used. Also, the polyvinyl alcohol-based resin may typically have a degree of polymerization of approximately 1,000 to 10,000, preferably approximately 1,500 to 5,000.

The polarizer may be prepared through a process of elongating (for example, uniaxially elongating) the above-described polyvinyl alcohol-based resin film, a process of staining the polyvinyl alcohol-based resin film with a dichroic dye and adsorbing the dichroic dye, a process of treating the polyvinyl alcohol-based resin film onto which the dichroic dye is adsorbed with an aqueous boric acid solution, a process of treating the polyvinyl alcohol-based resin film with an aqueous boric acid solution and washing the polyvinyl alcohol-based resin film, etc. As such, iodine or a dichroic organic dye may be used as the dichroic dye.

Also, the polarizing plate may further include a protective film attached to one or both surfaces of the polarizer. In this case, the pressure-sensitive adhesive layer may be formed on one surface of the protective film. Types of the protective film are not particularly limited. For example, the protective film that may be used herein may include a cellulose-based film such as triacetyl cellulose (TAC); a polyester-based film such as a polycarbonate film or poly(ethylene terephthalate) (PET); a polyethersulfone-based film; or a film having a single-layer structure or a stacked structure of two or more layers, such as a polyethylene film, a polypropylene film or a polyolefin-based film formed of a resin having a cyclo-based norbornene structure or an ethylene-propylene copolymer.

Also, the polarizing plate may further include at least one functional layer selected from the group consisting of a protective layer, a reflective layer, an anti-glare layer, a retardation plate, a wide viewing angle compensation film, and a brightness enhancement film.

Also in the pressure-sensitive adhesive polarizing plate, the adhesion-facilitating treatment layer may be present between the polarizer and the pressure-sensitive adhesive layer. Such an adhesion-facilitating treatment layer may be a layer formed by means of the hydroxyl group, the amino group, the carboxyl group, the urethane bond or the urea bond present on a surface of another functional layer such as a polarizer or a protective film formed on one surface of the polarizer, or may be a layer formed by subjecting a surface of the polarizer or another functional layer to corona discharge or plasma treatment.

In the present application, a method of forming a pressure-sensitive adhesive layer on such a polarizing plate or optical film is not particularly limited. For example, a pressure-sensitive adhesive layer may be formed on a polarizing plate or optical film by directly coating a pressure-sensitive adhesive composition onto the polarizing plate or optical film and curing the pressure-sensitive adhesive composition to form a cross-linked structure, or by coating a pressure-sensitive adhesive composition onto a release agent-treated surface of a release film and curing the pressure-sensitive adhesive composition to form a cross-linked structure, followed by transferring the pressure-sensitive adhesive composition to the polarizing plate or optical film.

As such, a method of coating a pressure-sensitive adhesive composition is not particularly limited. For example, a method of coating a pressure-sensitive adhesive composition using a conventional tool such as a bar coater may be used.

In a coating process, it is desirable from terms of performing a uniform coating process that the multifunctional cross-linking agent included in the pressure-sensitive adhesive composition is controlled to prevent a cross-linking reaction of a functional group from occurring during a coating process. In this way, the cross-linking agent may serve to improve the cohesiveness of the pressure-sensitive adhesive by allowing the pressure-sensitive adhesive to form a cross-linked structure during the curing and aging processes after the coating process, and to enhance pressure-sensitive adhesive properties and cuttability.

Also, the coating process may be preferably performed after bubble-forming components such as volatile components or residual reaction products are sufficiently removed from the pressure-sensitive adhesive composition. As a result, it is possible to prevent the modulus of elasticity from being degraded due to extremely low cross-linking density or molecular weight of the pressure-sensitive adhesive, and also to prevent a scattering center from being formed in bubbles when the bubbles increasingly occur between a glass plate and a pressure-sensitive adhesive layer under a high-temperature condition.

A method of curing the pressure-sensitive adhesive composition to form a cross-linked structure after the coating process is not particularly limited. For example, the pressure-sensitive adhesive composition may be cured using a method of maintaining a coating layer at a proper temperature to induce a cross-linking reaction between a multifunctional cross-linking agent and a block copolymer included in in the coating layer.

When necessary, a process of forming an adhesion-facilitating treatment layer on a surface of the polarizing plate or optical film on which the pressure-sensitive adhesive layer is formed, for example, corona discharge or plasma treatment, may be performed prior to forming the pressure-sensitive adhesive layer.

Still another aspect of the present application provides an optical laminate including a thin glass substrate; and the pressure-sensitive adhesive optical member or the polarizing plate attached to the glass substrate. The polarizing plate or the optical member may be attached to a glass substrate by means of the above-described pressure-sensitive adhesive. The pressure-sensitive adhesive layer formed of the pressure-sensitive adhesive composition according to one illustrative embodiment of the present application may exhibit excellent close adhesion to a base as described above, and also may effectively prevent bending of a thin substrate when applied onto the thin substrate. For example, the glass substrate may have a thickness of approximately 1 mm or less, approximately 0.9 mm or less, or approximately 0.8 mm or less. A lower limit of the thickness of the glass substrate is not particularly limited, and may, for example, be greater than or equal to approximately 0.1 mm, approximately 0.3 mm, or approximately 0.5 mm.

Yet another aspect of the present application provides a display device, for example, an LCD device. The display device may include the above-described pressure-sensitive adhesive optical member or polarizing plate. For example, when the display device is an LCD device, the display device may include a liquid crystal panel, and the polarizing plate or optical member attached to one or both surfaces of the liquid crystal panel. The polarizing plate or optical member may be attached to the liquid crystal panel by means of the above-described pressure-sensitive adhesive.

In the display device, all kinds of known panels, for example, a passive matrix panel such as a twisted nematic (TN) panel, super-twisted nematic (STN) panel, ferroelectic (F) panel, or a polymer-dispersed (PD) panel; an active matrix panel such as a two-terminal panel or a three-terminal panel; an in-plane switching (IPS)-mode panel, and a vertical alignment (VA)-mode panel, may be used as the liquid crystal panel.

Further, types of other components in the liquid crystal display device, for example, upper/lower substrates such as a color filter substrate or an array substrate, are not also particularly limited. For example, the components known in the related art may be used without limitation.

Effect

According to the illustrative embodiments of the present application, the pressure-sensitive adhesive composition, which can have excellent durability under high temperature or humidity conditions and exhibit high close adhesion to optical films, thereby forming a pressure-sensitive adhesive having superior cuttability and re-workability, can be provided. Also, according to the illustrative embodiments of the present application, the pressure-sensitive adhesive composition capable of forming a pressure-sensitive adhesive capable of effectively inhibiting bending when applied to a thin substrate such as a very thin glass substrate, minimizing a time required to stabilize physical properties, and preventing a degradation of the secured physical properties in time, the pressure-sensitive adhesive optical member formed using such a pressure-sensitive adhesive composition, the optical laminate, and the display device can be provided.

EMBODIMENT

Hereinafter, the pressure sensitive adhesive composition will be described referring to Examples and Comparative Examples, however the scope of the pressure sensitive adhesive composition is not limited thereto.

1. Determination of Molecular Weight

The number average molecular weight ($M_n$) and the polydispersity index (PDI) were measured using GPC under the following conditions. To prepare a calibration curve, measurement results were converted using standard polystyrene in an Agilent system.

<Measurement Conditions>

Measuring machine: Agilent GPC (Agilent 1200 series, USA)

Column: Two PL Mixed Bs connected

Column Temperature: 40° C.

Eluent: Tetrahydrofuran (THF)

Flow rate: 1.0 mL/min

Concentration: Approximately 1 mg/mL (100 μL injection)

2. Measurement of Adhesiveness to Glass

Each of pressure-sensitive adhesive polarizing plates prepared in Examples or Comparative Examples below was cut into pieces having a width of 25 mm and a length of 100 mm to be prepared as samples, and a release sheet (i.e., a release PET film) was removed. Thereafter, each of the samples was attached to an alkali-free glass using a laminator. Subsequently, the samples were stored for 24 hours under constant temperature/humidity conditions (23° C., and 50% relative humidity). Then, the peel strength was evaluated at room temperature using a texture analyzer (commercially available from Stable Micro Systems Ltd.) by peeling the pressure-sensitive adhesive polarizing plate from the alkali-free glass at a peel rate of 0.3 m/min and a peel angle of 180°.

3. Evaluation of Interfacial Adhesion of Pressure-Sensitive Adhesive/Base

During preparation of each of pressure-sensitive adhesive polarizing plates of Examples or Comparative Examples, a pressure-sensitive adhesive layer was formed, and each of the polarizing plates was then cut into pieces having a width of 7 cm and a length of 10 cm after the elapse of time as defined in the following evaluation criteria. Thereafter, a release sheet (a release PET film) was removed, and a pressure-sensitive adhesive tape (a pressure-sensitive adhesive tape for measurement) for measuring peeling of a pressure-sensitive adhesive was attached to a pressure-sensitive adhesive area having a width of 5 cm and a length of 10 cm using a laminator. Subsequently, the polarizing plates were kept for 5 minutes under constant temperature/humidity conditions (25° C., and 50% relative humidity), and an amount of the residual pressure-sensitive adhesive remaining on a base surface of each of the polarizing plates was determined while the attached pressure-sensitive adhesive tape for measurement was removed from the polarizing plates. Lattices were indicated on each of the polarizing plates in a longitudinal direction, and an amount of the pressure-sensitive adhesive remaining in each of the lattices was determined by observation with the naked eye.

<Evaluation Criteria>

A: At least 90% of a pressure-sensitive adhesive remains within a day after coating.

B: At least 90% of a pressure-sensitive adhesive remains within two days after coating.

C: At least 90% of a pressure-sensitive adhesive remains within three days after coating.

D: At least 90% of a pressure-sensitive adhesive remains within four days after coating.

4. Evaluation of Surface Resistance of Pressure-Sensitive Adhesive Layer

Each of pressure-sensitive adhesive polarizing plates prepared in Examples or Comparative Examples below was cut into pieces having a width of 50 mm and a length of 50 mm to be prepared into specimens. Thereafter, a release PET film attached to a pressure-sensitive adhesive layer of each of the specimens was removed, and the surface resistance of the pressure-sensitive adhesive layer was then measured. The surface resistance was measured according to the manufacturer's manual using a MCP-HT 450 system (commercially available from Mitsubishi Chemical Corp., Japan). The specimens were kept at 23° C. and 50% relative humidity for 24 hours, and a release sheet (a release PET film) was then removed from each of the polarizing plates. Then, a voltage of 500 V was applied to the specimens for one minute, and the specimens were measured.

Preparative Example 1: Preparation of Acrylic Block Copolymer (A1)

0.1 g of ethyl 2-bromoisobutyrate (EBiB) and 28.4 g of methylmethacrylate (MMA) were mixed with 12.4 g of ethyl acetate (EAc). A flask holding the resulting mixture was hermetically sealed with a rubber stopper, purged with nitrogen at approximately 25° C. for approximately 30 minutes, and stirred. Thereafter, dissolved oxygen was removed by bubbling. Then, 0.002 g of $CuBr_2$, 0.005 g of tris(2-pyridylmethyl)amine (TPMA), and 0.017 g of 2,2'-azobis(2,4-dimethyl valeronitrile) (V-65) g were added to the mixture from which oxygen was removed, and then soaked in a reaction bath at approximately 67° C. to initiate a reaction (polymerization of a first block). A mixture of 310 g of butyl acrylate (BA), 1.6 g of hydroxybutyl acrylate (HBA) and 500 g of ethyl acetate (EAc), which was bubbled in advance, was added in the presence of nitrogen when a conversion rate of methylmethacrylate reached approximately 75%. Subsequently, 0.006 g of $CuBr_2$, 0.012 g of TPMA, and 0.05 g of V-65 were added to a reaction flask, and a chain extension reaction was performed (polymerization of a second block). When a conversion rate of the monomer (BA) reached 80% or more, the reaction mixture was exposed to oxygen, and diluted with a proper solvent to terminate the reaction, thereby preparing a block copolymer (in this procedure, V-65 was added in properly divided amounts up to a point of time at which the reaction was terminated in consideration of the halt-lift of V-65).

Preparative Examples 2 and 3: Preparation of Acrylic Block Copolymers (A2) and (A3)

Bock copolymers were prepared in the same manner as in Preparative Example, as listed in the following Table 1, except that the types of source materials (monomers, etc.) used to polymerize the block copolymers and polymerization conditions were adjusted.

TABLE 1

|  |  | Preparative Examples | | | | | |
|---|---|---|---|---|---|---|---|
|  |  | 1<br>A1 | 2<br>B1 | 3<br>A2 | 4<br>A3 | 5<br>B2 | 6<br>B3 |
| First block | MMA content | 100 | 100 | 80 | 60 | 60 | 70 |
|  | BMA content | 0 | 0 | 20 | 40 | 40 | 30 |
|  | $T_g$ | 110 | 110 | 90 | 72 | 72 | 80 |
|  | $M_n$ (×10,000) | 2.9 | 1.9 | 3.2 | 1.7 | 2.9 | 3.8 |
|  | PDI | 1.37 | 1.27 | 1.44 | 1.32 | 1.38 | 1.41 |

TABLE 1-continued

| | | Preparative Examples | | | | | |
|---|---|---|---|---|---|---|---|
| | | 1<br>A1 | 2<br>B1 | 3<br>A2 | 4<br>A3 | 5<br>B2 | 6<br>B3 |
| Second block | BA content | 99 | 99.5 | 97 | 95 | 94 | 95 |
| | HBA content | 1 | 0.5 | 3 | 5 | 6 | 5 |
| | $T_g$ | −47 | −47 | −46.2 | −47 | −47.5 | −47 |
| Block copolymer | Mn (×10,000) | 23.7 | 10.6 | 27.3 | 10.4 | 14.1 | 10.4 |
| | PDI | 2.8 | 1.7 | 3.1 | 2.2 | 2.1 | 2.1 |
| | Weight ratio | 10.1:89.9 | 10.5:89.5 | 10:90 | 10.5:89.5 | 11.2:88.8 | 34.7:65.3 |

Units of content: part(s) by weight
$T_g$: glass transition temperature (Units: °C.)
$M_n$: number average molecular weight
PDI: polydispersity index
MMA: methyl methacrylate (a homopolymer having a $T_g$ of approximately 110° C.)
BMA: butyl methacrylate (a homopolymer having a $T_g$ of approximately 110° C.)
BA: butyl acrylate (a homopolymer having a $T_g$ of approximately −45° C.)
HBA: 4-hydroxybutyl methacrylate (a homopolymer having a $T_g$ of approximately −80° C.)
Weight ratio: weight ratio of a first block to a second block (first block:second block)

Example 1: Preparation of Pressure-Sensitive Adhesive Composition (Coating Solution)

0.1 parts by weight of a cross-linking agent (Coronate LS commercially available from Nippon Polyurethane Industry Co., Ltd.), 0.5 parts by weight of a multifunctional epoxy compound (N,N,N',N'-tetraglycidyl ethylenediamine), 1.0 parts by weight of an ionic liquid (FC-4400 commercially available from 3M), 0.01 parts by weight of 2-methylimidazole (commercially available from Acros Pvt. Ltd.), 0.01 parts by weight of dibutyltin dilaurate (DBTDL commercially available from Alfa Aesar), and 0.4 parts by weight of a silane coupling agent containing a β-cyanoacetyl group (AD M-812 commercially available from LG Chem. Ltd.) were mixed, based on 100 parts by weight of the block copolymer (A1) prepared in Preparative Example 1, and ethyl acetate was then blended as a solvent so that a coating solid content reached approximately 10 to 13% by weight, thereby preparing a coating solution (i.e., a pressure-sensitive adhesive composition).

Preparation of Pressure-Sensitive Adhesive Polarizing Plate

The prepared pressure-sensitive adhesive composition was coated onto a release agent-treated surface of a PET film (MRF-38 commercially available from Mitsubishi Corporation) having a thickness of approximately 38 μm as a release sheet so that a coating layer had a thickness after drying of 25 μm, and kept at 110° C. for approximately 3 minutes in an oven to form a pressure-sensitive adhesive layer. Thereafter, the prepared pressure-sensitive adhesive layer was laminated on one surface of a protective film (i.e., a TAC film) of an iodine-based polarizing plate to prepare a pressure-sensitive adhesive polarizing plate (the pressure-sensitive adhesive polarizing plate had a stacked structure of released PET/pressure-sensitive adhesive layer/TAC/PVA/TAC, where TAC=triacetylcellulose, and PVA=polyvinyl alcohol-based polarizing film).

Examples 2 to 7 and Comparative Examples 1 to 3

Pressure-sensitive adhesive compositions (coating solutions) and pressure-sensitive adhesive polarizing plates were prepared in the same manner as in Example 1, except that components and contents were altered as listed in the following Table 2 or 3 during preparation of the pressure-sensitive adhesive composition.

TABLE 2

| | Examples | | | | | | |
|---|---|---|---|---|---|---|---|
| | 1 | 2 | 3 | 4 | 5 | 6 | 7 |
| Types of block copolymer | A1 | A2 | A2 | A3 | B1 | B2 | B3 |
| NCO content | 0.1 | 0.1 | 0.1 | 0.45 | 0.1 | 0.07 | 0.2 |
| Epoxy content | 0.5 | — | — | — | 0.5 | 0.05 | 0.5 |
| Aziridine content | — | 1.5 | 1.5 | 1.5 | | | |
| Ionic liquid content | 1 | 3.5 | 1 | 1 | | | |
| Metal salt content | — | — | — | — | 1 | 1 | 1 |
| Content of Substance 1 | 0.01 | 0.05 | 0.05 | 0.05 | | | |
| Content of Substance 2 | | | | | 0.01 | 0.01 | 0.01 |
| Content of Substance 3 | 0.01 | 0.01 | 0.01 | 0.01 | 0.1 | 0.1 | 0.1 |
| SCA content | 0.4 | 0.4 | 0.4 | 0.4 | 0.2 | 0.2 | 0.2 |

Units of content: part(s) by weight based on 100 parts by weight of the block copolymer
NCO: Coronate LS (Nippon Polyurethane Industry Co., Ltd.)
Epoxy: N,N,N'.N'-tetraglycidyl ethylenediamine
Aziridine: triethylene melamine
Metal salt: LiTFSi: lithium bis(trifluoromethanesulfonyl imide)
Ionic liquid: FC-4400 (3M)
Metal salt: HQ-115A (3M)
Substance 1: 2-methyl imidazole (Acros Pvt. Ltd.)
Substance 2: 2-ethyl-4-methyl imidazole (TCI)
Substance 3: Dibutyltin dilaurate (Alfa Aesar)
SCA: silane coupling agent: AD-M812 (LG Chem. Ltd.)

TABLE 3

| | Comparative Examples | | |
|---|---|---|---|
| | 1 | 2 | 3 |
| Types of block copolymer | A1 | A2 | A3 |
| NCO content | 0.1 | 0.1 | 0.45 |
| Epoxy content | 0.5 | — | 0.5 |
| Aziridine content | — | — | — |
| Ionic liquid content | 1 | 1 | — |
| Metal salt content | — | — | 1 |
| Content of Substance 1 | — | 0.01 | — |

TABLE 3-continued

|  | Comparative Examples | | |
|---|---|---|---|
|  | 1 | 2 | 3 |
| Content of Substance 3 | 0.01 | 0.01 | 0.01 |
| SCA content | 0.4 | 0.4 | 0.4 |

Units of content: part(s) by weight based on 100 parts by weight of the block copolymer
NCO: Coronate LS (Nippon Polyurethane Industry Co., Ltd.)
Epoxy: N,N,N',N'-tetraglycidyl ethylenediamine
Aziridine: triethylene melamine
Ionic liquid: FC-4400 (3M)
Metal salt: HQ-115A (3M)
Substance 1: 2-methyl imidazole (Acros Pvt. Ltd.)
Substance 2: 2-ethyl-4-methyl imidazole (TCI)
Substance 3: Dibutyltin dilaurate (Alfa Aesar)
SCA: silane coupling agent: AD-M812 (LG Chem. Ltd.)

Physical properties measured for the polarizing plates prepared in Examples and Comparative Examples are listed in the following Table 4.

TABLE 4

|  |  | Adhesiveness (gf/25 mm) | Interfacial adhesion to pressure-sensitive adhesive/base | Surface resistance ($\times 10^{11}$ $\Omega/\Box$) |
|---|---|---|---|---|
| Examples | 1 | 450 | A | 2.3 |
|  | 2 | 360 | A | 1.4 |
|  | 3 | 460 | A | 4.2 |
|  | 4 | 210 | A | 3.1 |
|  | 5 | 310 | B | 0.1 |
|  | 6 | 300 | B | 0.1 |
|  | 7 | 200 | B | 0.1 |
| Comparative Examples | 1 | 430 | D | 2.3 |
|  | 2 | 480 | D | 3.6 |
|  | 3 | 230 | C | 4.5 |

What is claimed is:

1. A pressure-sensitive adhesive composition comprising:
(A) a block copolymer comprising a first block having a glass transition temperature of 50° C. or higher and a second block having a glass transition temperature of −10° C. or less, wherein a hydroxyl group is present in the first or second block;
(B) a multifunctional isocyanate compound;
(C) a multifunctional epoxy compound or a multifunctional aziridine compound; and
(D) at least one compound selected from the group consisting of an imidazole compound, a phosphine compound, an amine compound, and a phenolic compound, wherein the amine compound is a compound represented by the following Formula 3:

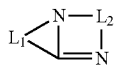

[Formula 3]

wherein $L_1$ and $L_2$ are each independently an alkylene group,
wherein the (B) multifunctional isocyanate compound is included at a content of 0.1 to 10 parts by weight, based on 100 parts by weight of the (A) block copolymer,
wherein the (C) multifunctional epoxy compound or multifunctional aziridine compound is included at a content of 0.01 to 10 parts by weight, based on 100 parts by weight of the (A) block copolymer, and wherein the (D) compound is included at a content of 0.001 to 0.1 parts by weight, based on 100 parts by weight of the (A) block copolymer.

2. The pressure-sensitive adhesive composition of claim 1, wherein the hydroxyl group of the (A) block copolymer is present only in the second block.

3. The pressure-sensitive adhesive composition of claim 1, wherein the (C) multifunctional epoxy compound comprises at least one selected from the group consisting of ethylene glycol diglycidyl ether, triglycidyl ether, trimethylolpropane triglycidyl ether, N,N,N',N'-tetraglycidyl ethylenediamine, and glycerin diglycidyl ether, and the multifunctional aziridine compound comprises at least one selected from the group consisting of N,N'-toluene-2,4-bis (1-aziridine carboxamide), N,N'-diphenylmethane-4,4'-bis (1-aziridine carboxamide), triethylene melamine, bisisoprotaloyl-1-(2-methylaziridine), and tri-1-aziridinylphosphineoxide.

4. The pressure-sensitive adhesive composition of claim 1, wherein the imidazole compound is a compound represented by the following Formula 1:

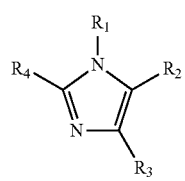

[Formula 1]

wherein $R_1$ to $R_4$ are each independently hydrogen, an alkyl group, or an aryl group.

5. The pressure-sensitive adhesive composition of claim 1, wherein the phosphine compound is a compound represented by the following Formula 2:

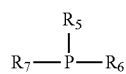

[Formula 2]

wherein $R_1$ to $R_7$ are each independently hydrogen, an alkyl group, or an aryl group.

6. The pressure-sensitive adhesive composition of claim 1, wherein the phenolic compound is a compound represented by the following Formula 5:

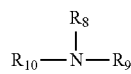

[Formula 4]

wherein $R_{11}$ to $R_{15}$ are each independently hydrogen, an alkyl group, an aminoalkyl group, an alkylaminoalkyl group, or a dialkylaminoalkyl group.

7. The pressure-sensitive adhesive composition of claim 1, further comprising an ionic liquid.

8. The pressure-sensitive adhesive composition of claim 7, wherein the ionic liquid is included at a content of 0.01 to 15 parts by weight, based on 100 parts by weight of the (A) block copolymer.

9. The pressure-sensitive adhesive composition of claim 1, further comprising a tin-based compound.

10. A pressure-sensitive adhesive optical member comprising:
   an optical film; and
   a pressure-sensitive adhesive layer formed on one or both surfaces of the optical film and comprising the pressure-sensitive adhesive composition of claim 1 in a cross-linked state.

11. The pressure-sensitive adhesive optical member of claim 10, wherein an adhesion-facilitating treatment layer is present between the optical film and the pressure-sensitive adhesive layer.

12. An optical laminate comprising:
   a glass substrate having a thickness of 1 mm or less; and
   the pressure-sensitive adhesive optical member of claim 10 attached to the glass substrate by means of the pressure-sensitive adhesive layer.

13. A display device comprising the pressure-sensitive adhesive optical member defined in claim 10.

14. A pressure-sensitive adhesive polarizing plate comprising:
   a polarizer; and
   a pressure-sensitive adhesive layer formed on one or both surfaces of the polarizer and comprising the pressure-sensitive adhesive composition of claim 1 in a cross-linked state.

15. The pressure-sensitive adhesive polarizing plate of claim 14, wherein an adhesion-facilitating treatment layer is present between the polarizer and the pressure-sensitive adhesive layer.

16. An optical laminate comprising:
   a glass substrate having a thickness of 1 mm or less; and
   the pressure-sensitive adhesive polarizing plate of claim 14 attached to the glass substrate by means of the pressure-sensitive adhesive layer.

17. A display device comprising the pressure-sensitive adhesive polarizing plate defined in claim 14.

* * * * *